Figure 1:
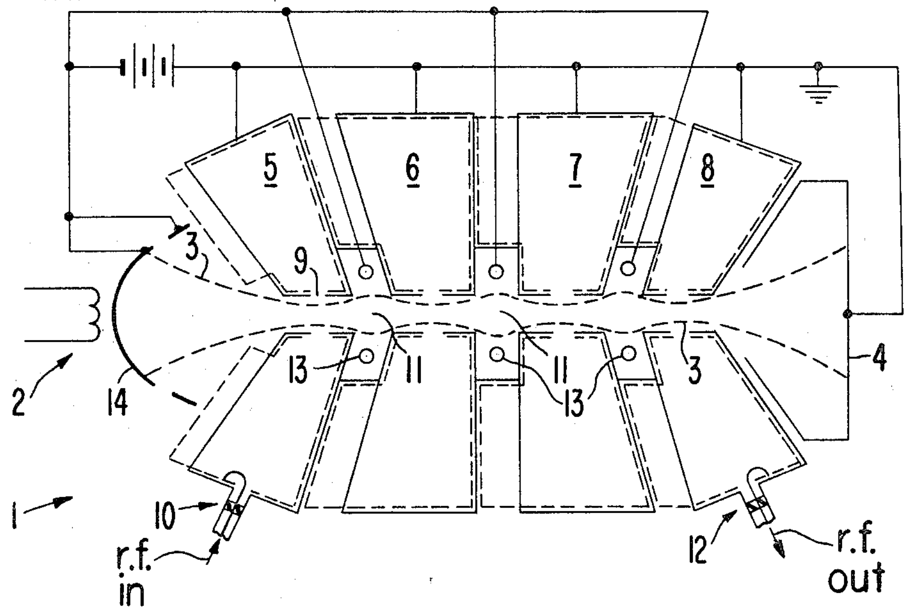

ELECTROSTATICALLY FOCUSED KLYSTRON HAVING CAVITIES WITH COMMON WALL STRUCTURES AND REENTRANT FOCUSING LENS HOUSINGS

Filed Nov. 10, 1966

INVENTOR.
JOHANN R. HECHTEL

BY Robert W. Dilts

ATTORNEY

ELECTROSTATICALLY FOCUSED KLYSTRON HAVING CAVITIES WITH COMMON WALL STRUCTURES AND REENTRANT FOCUSING LENS HOUSINGS
Filed Nov. 10, 1966 
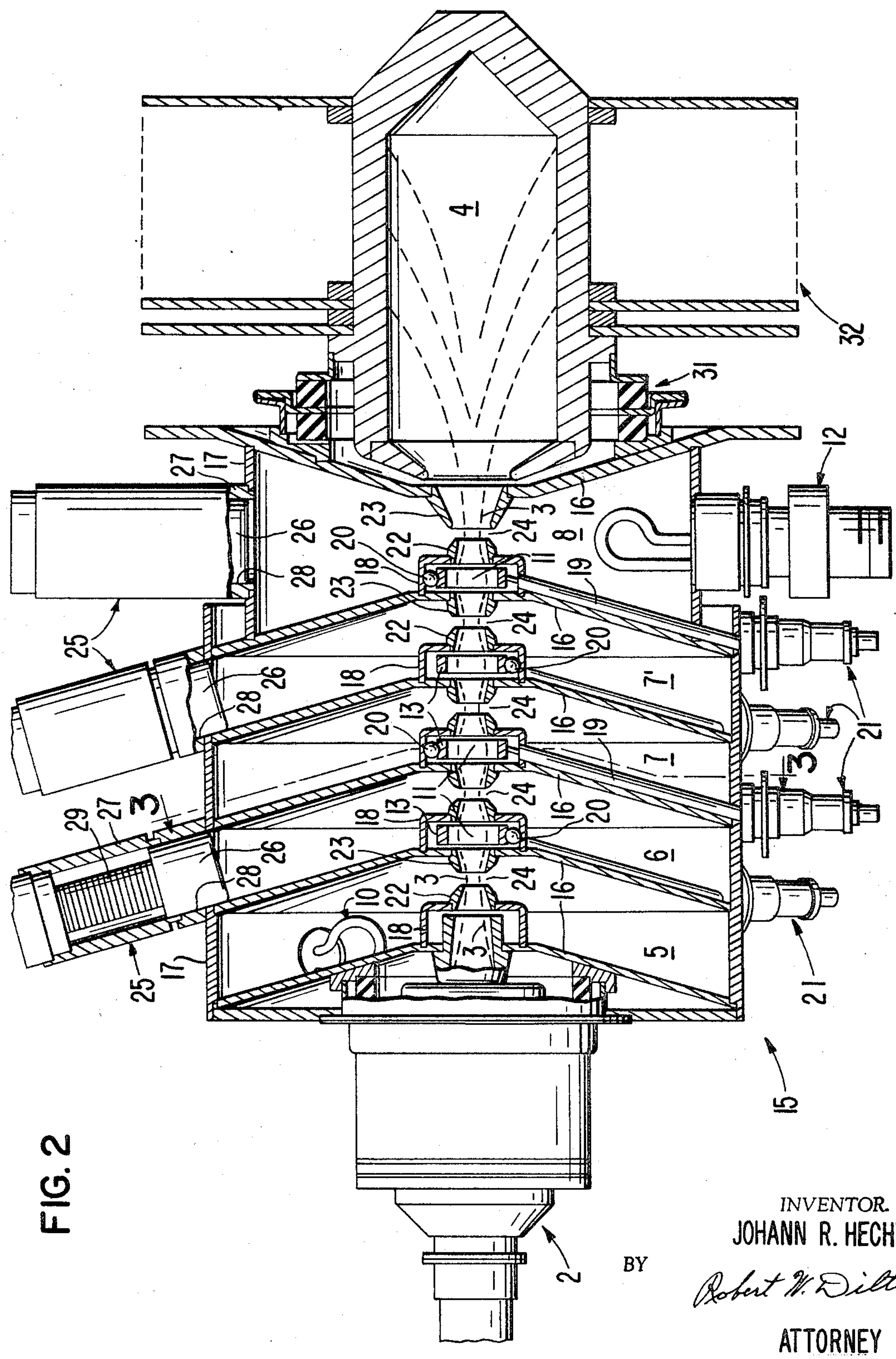
INVENTOR.
JOHANN R. HECHTEL
BY Robert W. Dilts
ATTORNEY United States Patent Office 3,436,588

Patented Apr. 1, 1969

3,436,588

ELECTROSTATICALLY FOCUSED KLYSTRON HAVING CAVITIES WITH COMMON WALL STRUCTURES AND REENTRANT FOCUSING LENS HOUSINGS

Johann R. Hechtel, Redwood City, Calif., assignor to Varian Associates, Palo Alto, Calif., a corporation of California Filed Nov. 10, 1966, Ser. No. 593,422

Int. Cl. H01j 25/10, 23/08, 23/20

U.S. Cl. 315—5.39 10 Claims

The present invention relates in general to electrostatically focused klystron tubes and, more particularly, to such tubes having cavities with common wall structures separating adjacent cavity resonators and with electrostatic beam focusing lens housings extending reentrantly into the cavity resonators, whereby the cavity *R/Q* may be optimized for a given period of the beam focusing lenses or, alternatively, the beam focusing period may be optimized to allow an increased beam perveance. An increased cavity *R/Q* or beam perveance provides increased R.F. circuit efficiency and increased bandwidth for the tube. A higher beam perveance allows use of a lower beam voltage. Such tubes are especially useful for, but not limited in use to, portable high power amplifier applications such as found in airborne and outer space communication systems where size and weight of such systems are limiting factors and where it is desirable not to introduce stray magnetic fields as would be produced by a magnetically focused tube.

Heretofore, multicavity electrostatically focused klystron amplifiers have been built. In these tubes, the cavity resonators are successively arranged along the linear beam path in axially spaced apart relation with the electrostatic beam focusing lenses being disposed in the drift tube regions between the separate walls of adjacent resonators. The axial spacing between adjacent cavity resonators, used to make room for the electrostatic focusing lenses, causes the cavity resonators to be thinner in the axial direction than desired for optimum interaction with the beam. In addition, the separate and axially spaced transverse cavity end walls between adjacent cavity resonators results in duplication of parts causing the tube to be heavier than it needs to be.

In the present invention, a plurality of klystron buncher cavities are defined by the spaces between a plurality of axially spaced transverse cavity walls carried within a cylindrical tube. As a result adjacent cavity resonators have a common end wall structure.

The electrostatic beam focusing lenses are disposed within lens housings which are formed by radially expanded sections of the reentrant drift tube members projecting into the cavity resonators, whereby, if the focusing lens period is retained at the same spacing as prior tubes without the common end wall structure, the cavities will have an increased *R/Q*. Alternatively, if the lens period is reduced while retaining thinner cavities the beam perveance is increased. An increased *R/Q* or perveance yields increased R.F. circuit efficiency and bandwidth, whereas an increased perveance permits use of a lower beam voltage.

In a preferred embodiment of the present invention, the transverse cavity end walls are conically shaped to provide increased strength for the tube structure. Leads for the electrostatic lenses are shielded and pass radially through the interior of the cavities to the lenses. Tubes embodying features of the present invention provide increased power output per unit weight of the tube. For example, an S-band tube of the present invention, in the power output range of 1 kw., provides 200 watts of C.W. power output for each pound of tube weight with an efficiency of about 50%.

The principal object of the present invention is the provision of an improved electrostatically focused klystron.

One feature of the present invention is the provision of a series of adjacent cavity resonators employing common end wall structures with the electrostatic beam focusing lenses disposed within lens housing structures projecting into the cavities, whereby the cavity structures result in cavity geometries having increased *R/Q* or which permit use of a beam having higher perveance.

Another feature of the present invention is the same as the preceding feature wherein the common cavity end walls are conically-shaped for increased tube strength.

Another feature of the present invention is the same as any one or more of the preceding features wherein the electrical leads for the electrostatic focusing lenses are shielded from the R.F. fields of the cavities and pass radially through the cavities to the electrostatic lenses.

Figure 3:
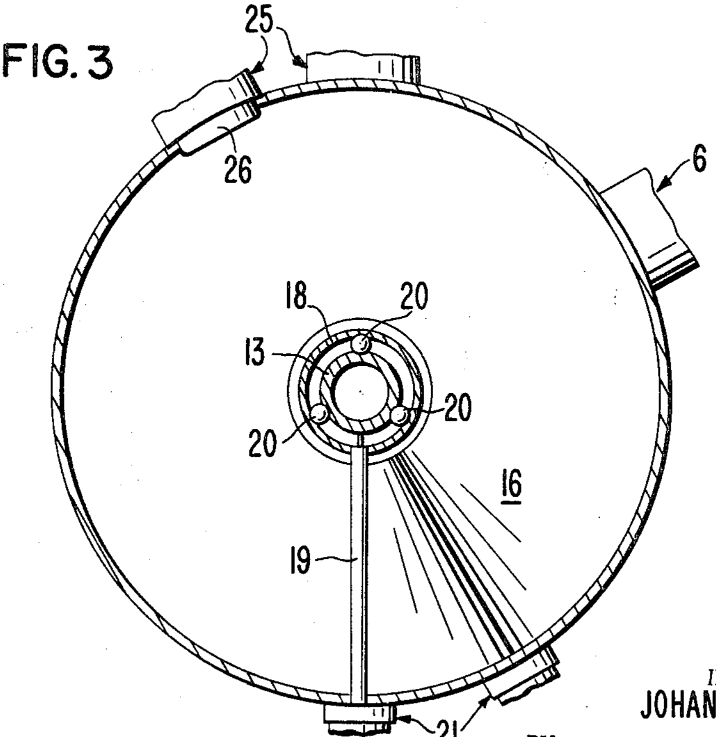

Other features and advantages of the present invention will become apparent upon a perusal of the following specification taken in connection with the accompanying drawings wherein:

FIGURE 1 is a schematic line diagram of an electrostatically focused klystron of the prior art, dotted lines depicting the present invention, FIGURE 2 is a longitudinal sectional view, partly in elevation, of the electrostatically focused klystron of the present invention, and FIGURE 3 is a sectional view of the structure of FIGURE 2 taken along line 3—3 in the direction of the arrows.

Referring now to FIGURE 1 there is shown the prior art electrostatically focused klystron amplifier. More particularly, an electron gun assembly 2 forms and projects a beam of electrons over an elongated beam path 3 to a beam collector electrode 4 for collecting and dissipating the energy of the beam. A plurality of reentrant cavity resonators 5, 6, 7 and 8 are successively arranged along the beam path for electromagnetic interaction with the beam 3. A first one of the resonators 5 forms the first buncher cavity and is excited with radio frequency (R.F.) signal wave energy to be amplified via input coupler 10. The R.F. fields, in the gap 9 of the first buncher resonator 5, velocity modulate the beam 3 with signal energy. The velocity modulation is transformed into current density modulation of the beam in the succeeding field free drift space 11 to excite the second buncher cavity 6. The fields of the excited buncher cavity 6 interact back on the beam to further velocity modulate the beam, which velocity modulation in like manner, is transformed into a higher degree of current density modulation by the succeeding drift space 11 and by the succeeding buncher cavity 7. The current density modulated beam excites the output cavity 8 with amplified signal energy which is extracted from the output cavity 8 via output coupler 12 and fed to a suitable utilization device, not shown.

A series of electrostatic lenses 13 are interposed in the field free drift regions 11 between successive cavity resonators for focusing the beam through the cavity resonators 6, 7 and 8. The lenses 13 are operated at cathode potential, whereas the cavity resonators 5–8 and collector 4 are operated at anode potential, as of +6 kv. relative to the cathode electrode 14 of the electron gun 2. However, the resonators and collector are grounded such that the cathode operates negative with respect to ground.

In the present invention, the geometry of the prior art cavities 5, 6, 7 and 8 has been altered, as indicated by the dotted lines, thereby substantially increasing the volume of the inductive portion of the cavities, thereby increasing the ratio of interaction impedance to cavity Q.

Moreover, the number of cavity parts has now been reduced because adjacent cavity resonators employ a single common end wall structure. Thus, a number of benefits accrue from the modified cavity resonator geometry of the present invention as follows: for a given operating frequency and beam voltage, the focusing period, i.e. space between successive lenses 13, can be shortened thereby obtaining improved beam focusing; the tube can be lighter and less expensive because fewer cavity wall structures are required; the cavity resonator's ratio of interaction impedance to cavity Q ($R/Q$) can be increased leading to less circuit loss, greater bandwidth, increased gain and improved efficiency.

Referring now to FIGURES 2 and 3 there is shown an electrostatically focused klystron 15 of the present invention. The tube 15 includes an electron gun 2 for forming and projecting the beam of electrons 3 to an air-cooled collector assembly 4. An input cavity 5, three additional buncher cavity resonators 6, 7 and 7', and an output cavity 8 are arranged along the beam path 3 for interaction with the beam in the manner as described above with regard to FIGURE 1.

The cavity resonators 5–8 are defined by the spaces between conical cavity end wall member 16 transversely mounted at their bases, as by brazing, to a cylindrical body shell structure 17 as of 3.07 inches in diameter. In one embodiment of the present invention, the cavity end walls 16 are made of molybdenum 0.040 inch thick and clad with copper to a thickness of 0.020 inch on each side. The end walls 16 have a cone angle of 150° to prevent oil-canning with temperature changes. Copper clad molybdenum combines high mechanical strength with a low thermal coefficient of expansion, has good electrical and thermal conductivity, and is nonmagnetic. The conically-shaped cavities 5–8 provide a maximum mechanical strength with a minimum of weight. The cylindrical body shell 17 is made from a 0.040 inch thick molybdenum cylinder brazed to an inner copper cylinder, as of 0.040 inch thick.

A series of donut-shaped electrostatic lenses 13, as of molybdenum, are situated inside cup-shaped lens housing structures 18 which project axially from the apex of the conical end walls 16 into the cavity resonators 5–8. The lenses 13 are supported from the inside of the lens housing cups 18 by means of spherical ceramic insulators 20 as of polished alumina ceramic 0.125 inch in diameter, disposed at 120° intervals about the circumference of the lenses 13 and held in place by being positioned in semi-spherical recesses in the lenses 13 and in the inside surface of the lens housing 18.

Operating potentials for the lenses 13 are supplied thereto via evacuated coaxial leads 19, as of 0.125 inch in diameter, passing into the cavity resonators 6–8 via hermetically sealed feedthrough insulator assemblies 21. The inner conductors of the coaxial leads 19 are connected to the respective lenses 13. The outer conductors are connected at both ends to the walls of the cavities to shield the inner conductors from the R.F. fields of the cavity resonators.

One set of drift tube members 22 are carried at one end from the bottom of the cup-shaped lens housing structures 18 and project axially inwardly of the cavity resonators 5–8. Another set of drift tube members 23 are carried from the apex of the conical headers 16 and project axially of the tube into the cavities 5–8 in mutually opposed relation to the first set of drift tubes 22. The mutually opposed free ends of the drift tube segments 22 and 23 define therebetween the cavity interaction gaps 24.

Each set of drift tube members 23 and 22 with the interposed lens housing structure 18 defines an R.F. field free drift region 11 between successive cavity resonators. Movable wall inductive tuning structures 25 are mounted in each of the cavity resonators 5–8 for tuning thereof. The tuning structures include a cylindrical conductive tuning plunger 26 movable transversely into the cavity resonators through a cylindrical tube 27 communicating with the interior of the cavity resonators via circular apertures 28 in the side walls of the cavities. The plungers are vacuum sealed to the tube's envelope structure via expandable metallic bellows 29. The input cavity 5 is excited with signal energy to be amplified via input coupler 10 and the amplified output signal is extracted from the output cavity 8 via output coupler 12.

The collector assembly 4 is carried from the final cavity header 16 in the output cavity 8 via an annular insulator assembly 31 in order to permit operation of the collector at less than anode potential for a depressed collector mode of operation. The collector 4 may be air-cooled via fins 32 or conduction-cooled by deleting the fins and connecting the collector 4 to a heat sink, not shown, for conduction cooling.

In a typical example of an S-band tube as shown in FIGURES 2 and 3, the minimum drift tube radius was 0.254 cm. the maximum drift tube radius was 0.35 cm., the lens 13 to lens 13 spacing was 1.65 cm., the buncher cavities 6–7 had an $R/Q$ of 64, the output cavity 8 had an $R/Q$ of 85 due to the more favorable form factor of this cavity, the lenses weret operated at cathode potential, and at 3.5 kv. beam voltage the tube delivered 200 watts C.W. power output at 2100 mHz. with 40% efficiency. At 6.5 kv. beam voltage and −7.5 kv. lens voltage, the tube delivered 1 kw. of output power at 2150 mHz. with 51% efficiency and 30 db power gain, and at 300 mw. input drive power the tube had an instantaneous bandwidth of 6 mHz. At the 1 kw. power output, the tube provided 200 watts of S-band power per pound.

Although the tube of FIGURES 2 and 3 was shown and described employing conical cavity headers 16 these headers could have been planar with some sacrifice in strength. In another exemplary tube, incorporating features of the present invention and using a stainless steel body shell 17 and conical end walls 16 having a cone angle of 170°, the tube delivered 10 kw. C.W. power in the U.H.F. television band and weighed only 65 pounds as compared to 250 pounds for the conventional magnetically focused tube including its magnets. Also the tube of the present invention occupied on the order of only $1/10$ the volume of the conventional magnetically focused tube.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrostatically focused microwave tube apparatus including; means for forming and projecting a beam of electrons over an elongated beam path; means at the terminal end of the beam path for collecting and dissipating the energy of the beam; means forming a plurality of cavity resonators successively arranged along the beam path intermediate said beam forming means and said beam collecting means for electromagnetic interaction with the beam to modulate the beam with signal energy; means forming an output circuit coupled to the beam and excited by the signal modulation on the beam to extract R.F. energy from the beam for propagation to a utilization device; said means forming a plurality of cavity resonators including, a plurality of axially spaced transverse wall members defining common end wall structures for adjacent ones of said cavity resonators; means forming a plurality of electrostatic beam focusing lenses axially spaced apart along the beam path for focusing the beam through said cavity resonators; means forming a plurality of hollow lens housing structures carried from said transverse cavity wall members and axially projecting from said cavity wall members into said cavity resonators; and said lens housing structures containing said electrostatic beam focusing lenses, whereby the cavity resonator geometries defined by said common wall structures and said lens housing structures are structurally strong and provide improved electronic interaction impedances for the tube apparatus.

2. The apparatus of claim 1 including means forming radio frequency shielded electrical lead structures passing transversely into said cavity resonators to said electrostatic beam focusing lenses as disposed inside said lens housing structures for applying operating potentials to said lenses.

3. The apparatus of claim 1 wherein said common cavity end wall structures are conically-shaped to provide increased strength for said cavity resonators defined thereby.

4. The apparatus of claim 1 including means defining tubular conductive drift tube members carried at the inner ends of said axially projecting lens housing structures and projecting from said lens housing structures toward the opposed end walls of said cavities to define therewithin radio frequency field-free regions on the beam path inside said cavity resonators.

5. The apparatus of claim 4 including means defining second tubular conductive drift tube members axially aligned with said first drift tube members and carried from said common cavity wall structures, said second drift tube members projecting from said common cavity wall structures into said cavity resonators in opposed relation to said first drift tube members and in axially spaced relation therefrom, said first and second mutually opposed axially spaced drift tube members defining cavity resonator electronic interaction gaps in the spaces between their mutually opposed end portions.

6. The apparatus of claim 5 wherein said electrostatic lenses are interposed in the field free drift regions between adjacent first and second ones of said drift tube members as carried from a common cavity end wall structure.

7. The apparatus of claim 6 wherein said common cavity end wall structures are conically-shaped for strengthening said cavity resonators.

8. The apparatus of claim 7 wherein said common cavity end wall structures are made of copper clad molybdenum for strengthening said cavities while providing good electrical conductivity for said cavities.

9. The apparatus of claim 6 including means forming a metallic tube structure having said common cavity end wall structures transversely mounted therein in axially spaced apart relation to form the enclosing outer side walls of said cavity resonators.

10. The apparatus of claim 1 including, spherical ceramic insulators disposed about the periphery of said beam focusing lenses in between said lenses and said lens housing structures for supporting and insulating said lenses from said lens housing structures.

References Cited

UNITED STATES PATENTS

| | | | |
|---|---|---|---|
| 2,610,306 | 9/1952 | Touraton et al. ---- | 315—534 X |
| 3,274,430 | 9/1966 | El-Hefni --------- | 315—552 X |

HERMAN K. SAALBACH, *Primary Examiner.*

SAXFIELD CHATMON, Jr., *Assistant Examiner.*

U.S. Cl. X.R.

315—5.34, 5.42, 5.52